United States Patent
Kitabatake et al.

(10) Patent No.: US 9,186,976 B2
(45) Date of Patent: Nov. 17, 2015

(54) VEHICULAR TRANSMISSION

(75) Inventors: Hirotatsu Kitabatake, Susono (JP); Yuji Iwase, Mishima (JP); Hideaki Komada, Gotenba (JP); Yosuke Suzuki, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/386,265

(22) PCT Filed: Mar. 19, 2012

(86) PCT No.: PCT/JP2012/057075
§ 371 (c)(1),
(2), (4) Date: Sep. 18, 2014

(87) PCT Pub. No.: WO2013/140527
PCT Pub. Date: Sep. 26, 2013

(65) Prior Publication Data
US 2015/0040720 A1   Feb. 12, 2015

(51) Int. Cl.
*F16H 37/06* (2006.01)
*B60K 6/50* (2007.10)
(Continued)

(52) U.S. Cl.
CPC . *B60K 6/50* (2013.01); *B60K 6/383* (2013.01); *B60K 6/445* (2013.01); *B60W 20/40* (2013.01); *B60Y 2300/71* (2013.01); *B60Y 2400/4242* (2013.01); *Y02T 10/6239* (2013.01); *Y10S 903/902* (2013.01)

(58) Field of Classification Search
CPC .. B60K 6/48; B60K 2006/4825; F16H 3/089; F16H 59/02; F16H 57/02; F16H 57/0423
USPC ............ 74/661, 665 A, 665 D, 665 E, 606 R
See application file for complete search history.

(56) References Cited

U.S. PATENT DOCUMENTS

| | | | | | |
|---|---|---|---|---|---|
| 4,725,951 | A | * | 2/1988 | Niikura | B60W 10/06 192/3.31 |
| 5,348,127 | A | * | 9/1994 | Murata | F16F 15/134 192/3.3 |

(Continued)

FOREIGN PATENT DOCUMENTS

| | | |
|---|---|---|
| JP | 2000-355224 A | 12/2000 |
| JP | 2001-342933 A | 12/2001 |

(Continued)

OTHER PUBLICATIONS

International Search Report for PCT/JP2012/057075 dated Jun. 5, 2012.

*Primary Examiner* — Ha D Ho
(74) *Attorney, Agent, or Firm* — Sughrue Mion, PLLC

(57) ABSTRACT

A vehicular transmission includes a transmission input shaft to which engine torque is input, first and second differential mechanisms as transmission mechanisms to which the engine torque is input through the transmission input shaft, a torque limiter arranged between the transmission input shaft and an engine configured to enable torque transmission between the transmission input shaft and an engine output shaft and inhibit an input of excessive torque larger than predetermined torque between the transmission input shaft and the engine output shaft, and a one-way clutch arranged between the torque limiter and the engine for prohibiting reverse rotation of the engine while allowing normal rotation of the engine.

20 Claims, 11 Drawing Sheets

(51) Int. Cl.
*B60K 6/383* (2007.10)
*B60K 6/445* (2007.10)
*B60W 20/00* (2006.01)

(56) References Cited

U.S. PATENT DOCUMENTS

| | | | |
|---|---|---|---|
| 6,269,895 B1 * | 8/2001 | Tanuguchi | B60K 6/365 180/65.1 |
| 8,423,222 B2 * | 4/2013 | Hisada | B60K 6/383 701/22 |
| 8,528,388 B2 * | 9/2013 | Yutani | B60K 6/365 73/114.15 |
| 8,858,345 B2 * | 10/2014 | Sugiyama | F16F 15/1392 464/46 |
| 9,121,492 B2 * | 9/2015 | Schoenek | B60K 6/48 |
| 2003/0069104 A1 | 4/2003 | Nakano et al. | |

FOREIGN PATENT DOCUMENTS

| | | |
|---|---|---|
| JP | 2002-103999 A | 4/2002 |
| JP | 200332808 A | 1/2003 |
| JP | 2006-298246 A | 11/2006 |
| JP | 20091127 A | 1/2009 |
| JP | 2009-062022 A | 3/2009 |
| JP | 2009-120043 A | 6/2009 |
| JP | 2010-139052 A | 6/2010 |

* cited by examiner though the engine torque is input through the transmission input shaft; a torque limiter arranged between the transmission input shaft and an engine, configured to enable torque transmission

VEHICULAR TRANSMISSION

CROSS REFERENCE TO RELATED APPLICATIONS

This application is a National Stage of International Application No. PCT/JP2012/057075 filed Mar. 19, 2012, the contents of all of which are incorporated herein by reference in their entirety.

FIELD

The present invention relates to a vehicular transmission provided with a locking device which allows normal rotation of an engine and prohibits reverse rotation thereof.

BACKGROUND

A vehicular transmission provided with a device for locking rotation in one direction which prohibits reverse rotation of an engine while allowing normal rotation of the engine by being disengaged when an engine output shaft normally rotates and engaged when the engine output shaft is about to reversely rotate is conventionally known.

A vehicular transmission of Patent Literature 1 is provided with a one-way clutch as a locking device and a planetary gear mechanism provided with rotational elements to each of which an output shaft of the one-way clutch and a transmission output shaft side (drive wheel side) are connected. A hybrid system including the vehicular transmission is provided with a first motor-generator connected to another rotational element of the planetary gear mechanism and a second motor-generator connected to the transmission output shaft side (drive wheel side). In the vehicular transmission of Patent Literature 1, the one-way clutch is arranged between an engine and the planetary gear mechanism in an axial direction of a transmission input shaft. In the hybrid system of Patent Literature 1, the first and second motor-generators are used together as power sources at the time of travel.

A vehicular transmission of Patent Literature 2 is provided with a one-way clutch as a locking device, a damper device which inhibits torque variation between a transmission input shaft and an engine output shaft, and a planetary gear mechanism provided with rotational elements to each of which the transmission input shaft and a transmission output shaft side (drive wheel side) are connected. A hybrid system including the vehicular transmission is provided with a first motor-generator connected to another rotational element of the planetary gear mechanism and a second motor-generator connected to the transmission output shaft side (drive wheel side). In the vehicular transmission of Patent Literature 2, the one-way clutch is arranged between the planetary gear mechanism and the first motor-generator in an axial direction of the transmission input shaft and an inner ring of the one-way clutch is connected to the rotational element (rotational element to which the first motor-generator is connected) of the planetary gear mechanism.

Patent Literature 3 discloses a vehicular transmission to which a meshing clutch is applied as a locking device. The meshing clutch may allow normal rotation of an engine in a disengaged state and prohibit reverse rotation of the engine by stopping rotation of an engine rotational shaft in an engaged state. In a hybrid system including the vehicular transmission, the meshing clutch is engaged at the time of EV travel and regenerative travel and the meshing clutch is disengaged at the time of engine travel.

CITATION LIST

Patent Literature

Patent Literature 1: Japanese Patent Application Laid-open No. 2000-355224
Patent Literature 2: Japanese Patent Application Laid-open No. 2002-103999
Patent Literature 3: Japanese Patent Application Laid-open No. 2009-120043
Patent Literature 4: Japanese Patent Application Laid-open No. 2010-139052

SUMMARY

Technical Problem

In the conventional vehicular transmission, when excessive torque is input to the engaged one-way clutch, it is not possible to let the torque out, so that durability of the one-way clutch might be deteriorated. Therefore, it is required to provide an overload input inhibiting device which inhibits the input of the excessive torque to the one-way clutch on the vehicular transmission. For example, Patent Literature 1 discloses the vehicular transmission in which a normal clutch is arranged between the engine and the one-way clutch. Therefore, the vehicular transmission of Patent Literature 1 may use the clutch as the overload input inhibiting device. However, when such dedicated normal clutch is provided as the overload input inhibiting device of the one-way clutch, not only a configuration of the clutch but also an actuator which operates the clutch by a hydraulic pressure and the like are required, so that a size of the vehicular transmission might be increased. In this case, it is also required to control operation of the clutch by an electronic control device.

Herein, a so-called torque limiter which does not require the control by the electronic control device is known as the overload input inhibiting device. For example, Patent Literature 4 described above discloses a torque limiter integrated with a damper device. The torque limiter does not require a drive source such as an actuator, so that this may easily inhibit an increase in size of the vehicular transmission as compared to the above-described clutch. On the other hand, even when such torque limiter is applied to the vehicular transmission of Patent Literature 2, since the one-way clutch is arranged between the planetary gear mechanism and the first motor-generator in this vehicular transmission, space for arranging this is required and this increases the size (especially shaft length) of the vehicular transmission by an amount of the space for arrangement.

Therefore, an object of the present invention is to improve disadvantages of such conventional examples and provide the vehicular transmission provided with the locking device which prohibits the reverse rotation of an engine while allowing the normal rotation of the engine and the overload input inhibiting device capable of inhibiting the input of the excessive torque to the locking device while inhibiting the increase in size.

Solution to Problem

A vehicular transmission according to the present invention includes a transmission input shaft to which engine torque is input; a transmission mechanism to which the engine torque is input through the transmission input shaft; a torque limiter arranged between the transmission input shaft and an engine, configured to enable torque transmission between the transmission input shaft and an engine output shaft and inhibit an input of excessive torque larger than predetermined torque between the transmission input shaft and the engine output shaft; and a locking device arranged between the torque limiter and the engine, configured to prohibit reverse rotation of the engine and allow normal rotation of the engine.

In the vehicle transmission, it is preferable that a part of a configuration of the locking device is fixed to a flywheel which is connected to the engine output shaft.

In the vehicle transmission, it is preferable that the vehicle transmission further includes a damper device configured to inhibit and absorb torque variation between the transmission input shaft and the engine output shaft, wherein the locking device is arranged between the damper device and the engine.

In the vehicle transmission, it is preferable that a motor-generator in a hybrid system is connected to the transmission mechanism.

In the vehicle transmission, it is preferable that the transmission mechanism is provided with a plurality of rotational elements capable of performing differential rotation to each of which a first motor-generator, a drive wheel side and a second motor-generator, and the engine are connected.

In the vehicle transmission, it is preferable that the locking device is a one-way clutch which allows only the normal rotation regarding rotation of the engine.

In the vehicle transmission, it is preferable that the locking device is a meshing clutch capable of stopping rotation of the engine output shaft.

In the vehicle transmission, it is preferable the locking device is a brake capable of stopping rotation of the engine output shaft.

Advantageous Effects of Invention

In the vehicle transmission, various members are arranged in a case. Space between a position in which the torque limiter is arranged and the engine out of them is a mating surface portion of the vehicular transmission and the engine, so that this easily becomes larger than that in another position in the case. Therefore, the vehicular transmission according to the present invention may be provided with the locking device which allows only the normal rotation regarding rotation of the engine while inhibiting the increase in size by arranging the locking device (one-way clutch, mashing clutch, and brake) between the torque limiter and the engine. Although the torque limiter is provided for inhibiting the input of the excessive torque between the transmission input shaft and the engine output shaft in the vehicular transmission, the torque limiter may also be used for inhibiting the input of the excessive torque input to the locking device. That is to say, according to the vehicular transmission, it is possible to inhibit the input of the excessive torque to the locking device in the engaged state at the time of travel in a state in which the engine is disconnected from a drive wheel without providing a dedicated torque limiter for the locking device. Therefore, the vehicular transmission according to the present invention may be provided with the torque limiter capable of inhibiting the input of the excessive torque to the locking device while inhibiting the increase in size.

DESCRIPTION OF EMBODIMENTS

An embodiment of a vehicular transmission according to the present invention is hereinafter described in detail with reference to the drawings. Meanwhile, the present invention is not limited by the embodiment.

Embodiment

An embodiment of a vehicular transmission according to the present invention is described with reference to FIGS. 1 to 11.

Figure 1:
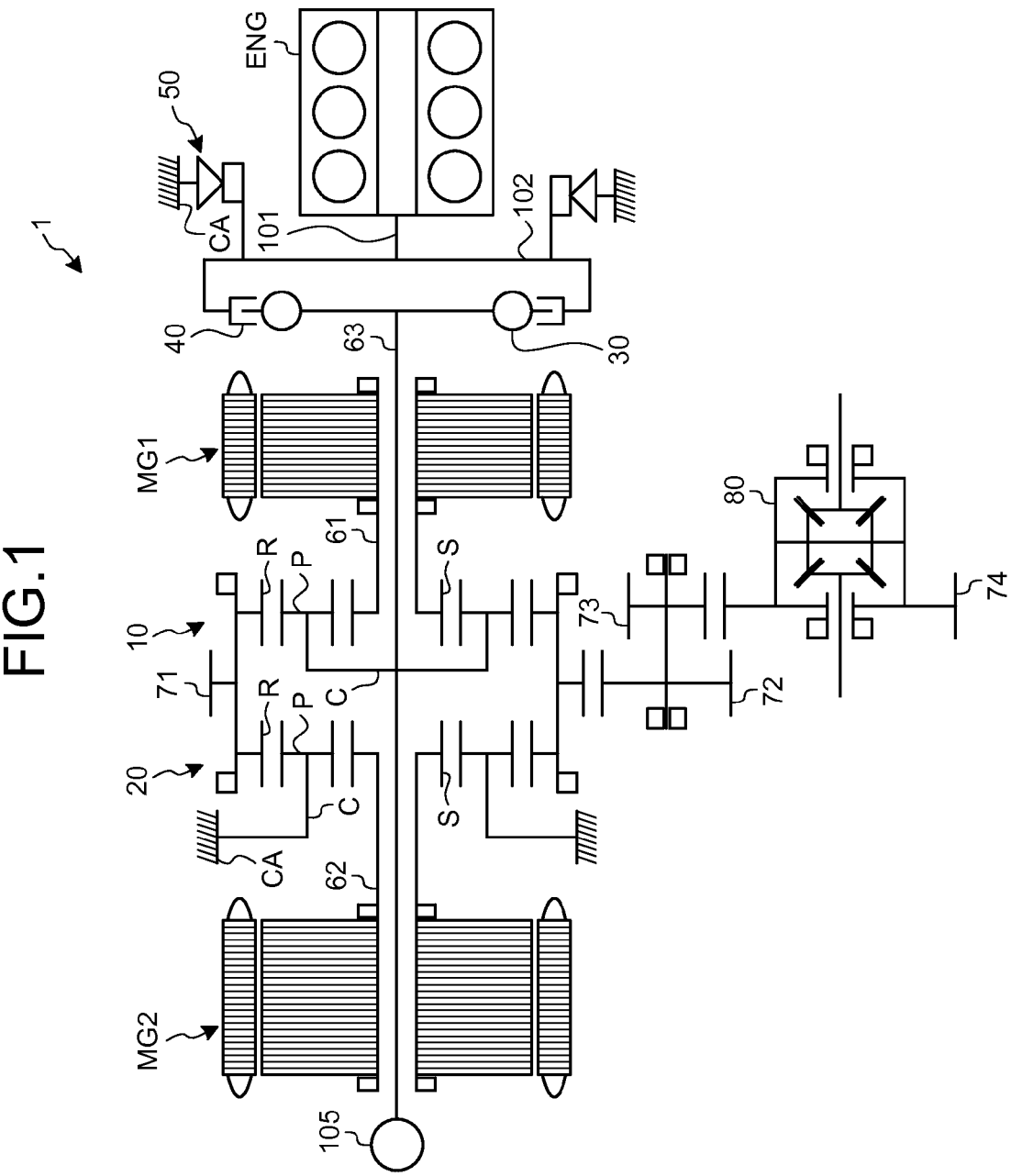
FIG. 1 is a view of an example of a hybrid system to which a vehicular transmission of an embodiment is applied.

Reference numeral 1 in FIG. 1 represents a vehicular transmission of this embodiment. The vehicular transmission 1 herein illustrated is a transmission mounted on a so-called hybrid vehicle to which an engine ENG as a power source is connected an input side, and including a first motor-generator MG1 and a second motor-generator MG2 embedded as other power sources. Herein, a uniaxial hybrid system in which a rotational shaft of the first motor-generator MG1 (MG1 rotational shaft) 61 and a rotational shaft of the second motor-generator MG2 (MG2 rotational shaft) 62 are arranged concentrically with a transmission input shaft 63 is described as an example. The vehicular transmission 1 is illustrated as a so-called transaxle in which a differential device 80 is also embedded in a same case CA.

Herein, the engine ENG is the power source such as an internal-combustion engine and an external-combustion engine which outputs mechanical power (engine torque) from an engine output shaft (crankshaft) 101. On the other hand, the first and second motor-generators MG1 and MG2 operate as the power sources by power running drive and operate as generators by regenerative drive. For example, the first and second motor-generators MG1 and MG2 configured as permanent magnet AC synchronous motors are used. Meanwhile, although the motor-generator as an electric motor generator is herein described as an example, this may be replaced with a motor capable of performing regenerative drive or a generator capable of performing power running drive.

The vehicular transmission 1 is provided with first and second differential mechanisms 10 and 20, a damper device 30, a torque limiter 40, and a one-way clutch 50.

Each of the first and second differential mechanisms 10 and 20 is provided with a plurality of rotational elements capable of performing differential rotation. In this hybrid system, the first differential mechanism 10 is prepared as a power dividing mechanism and the second differential mechanism 20 is prepared as a transmission mechanism. In this hybrid system, it is possible to continuously change a system transmission ratio by controlling a differential state of the first differential mechanism 10 and the second differential mechanism 20. Therefore, it may also be said that the transmission mechanism is formed of the first and second differential mechanisms 10 and 20 in this hybrid system. The first and second differential mechanisms 10 and 20 are concentrically arranged around the transmission input shaft 63.

The first differential mechanism 10 is provided with rotational elements to each of which the first motor-generator MG1, an output side (drive wheel side) and the second differential mechanism 20 (second motor-generator MG2), and the engine ENG are connected. Herein, a single pinion planetary gear mechanism provided with a sun gear S, a ring gear R, a carrier C, and a plurality of pinion gears P being the rotational elements is illustrated as the first differential mechanism 10. In the first differential mechanism 10, the sun gear S, the ring gear R, and the carrier C may rotate relatively to one another.

The sun gear S is connected to the MG1 rotational shaft 61 concentrically arranged therewith and may rotate integrally with the MG1 rotational shaft 61. The carrier C holds each pinion gear P so as to be rotatable and revolvable. The carrier C is connected to the transmission input shaft 63 and rotates integrally with the transmission input shaft 63. The carrier C is connected to the engine output shaft 101 through the transmission input shaft 63, the damper device 30, and an overload input inhibiting device (torque limiter 40). Meanwhile, the carrier C is connected to an oil pump 105. The oil pump 105 is driven in conjunction with the rotation of the carrier C to deliver lubricant oil to be supplied to each unit of the vehicular transmission 1.

The second differential mechanism 20 is provided with rotational elements to each of which the second motor-generator MG2, and the output side (drive wheel side) and the first differential mechanism 10 are connected. Herein, the single pinion planetary gear mechanism is illustrated as the second differential mechanism 20 as in the case of the first differential mechanism 10. The sun gear S is connected to the MG2 rotational shaft 62 concentrically arranged therewith and may rotate integrally with the MG2 rotational shaft 62. The carrier C is used as a fixed element fixed to the case CA and holds each pinion gear P so as to be rotatable. Therefore, in the second differential mechanism 20, the sun gear S and the ring gear R rotate relatively to each other and rotate relative to the carrier C.

The ring gears R of the first and second differential mechanisms 10 and 20 are engaged with each other through a first gear 71. The first gear 71 is an externally-toothed gear centered on the transmission input shaft 63 and transmits the power of the engine ENG and the like to the drive wheel side. The vehicular transmission 1 is provided with a second gear 72 meshing with the first gear 71, a third gear 73 arranged concentrically therewith and rotating integrally with the second gear 72, and a fourth gear 74 as a final gear meshing with the third gear 73. The fourth gear 74 is attached to a case of the differential device 80 which divides drive force to drive wheels.

Figure 2:
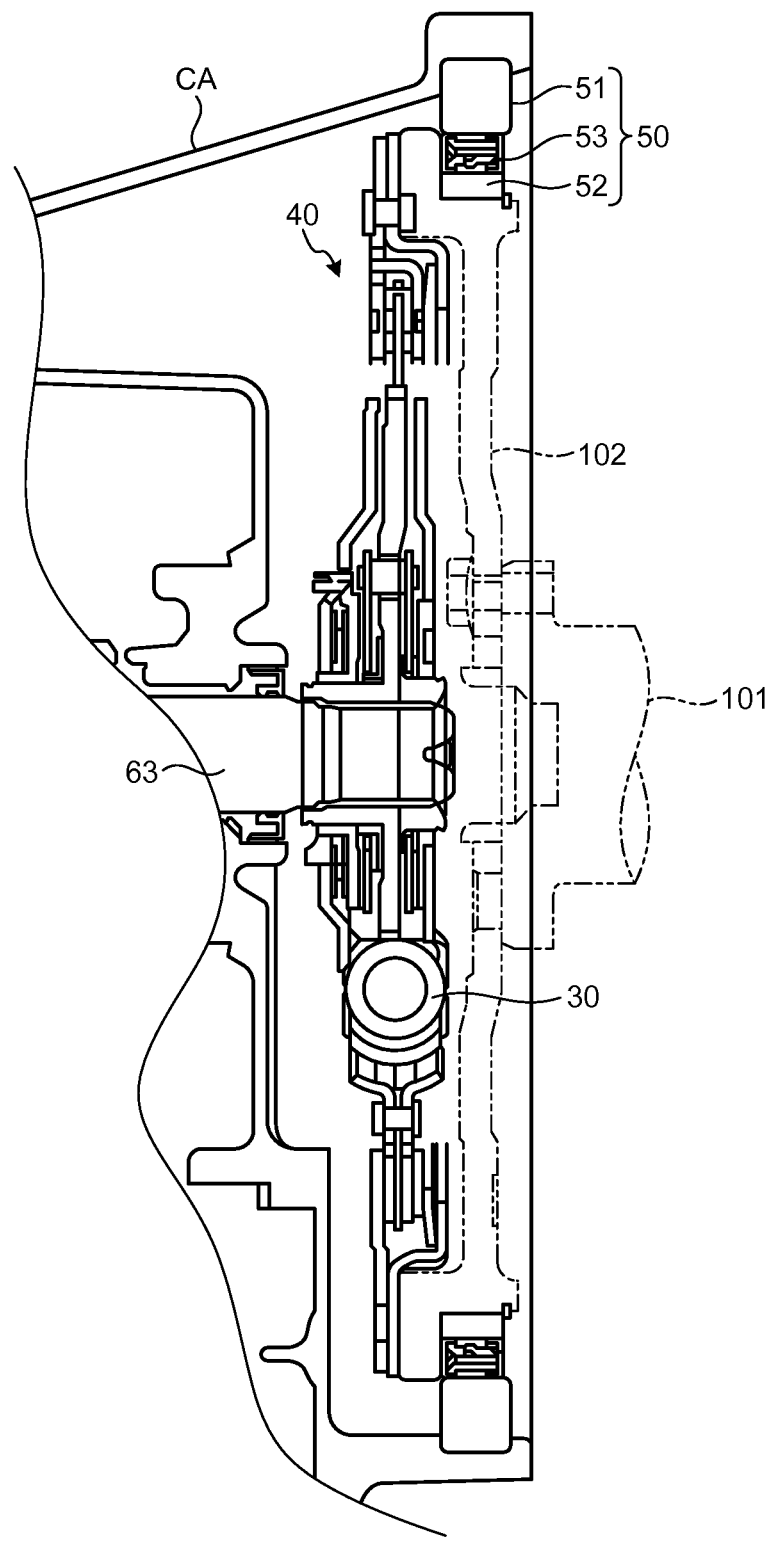
FIG. 2 is a view illustrating an example of an arrangement of a one-way clutch.
Figure 3:
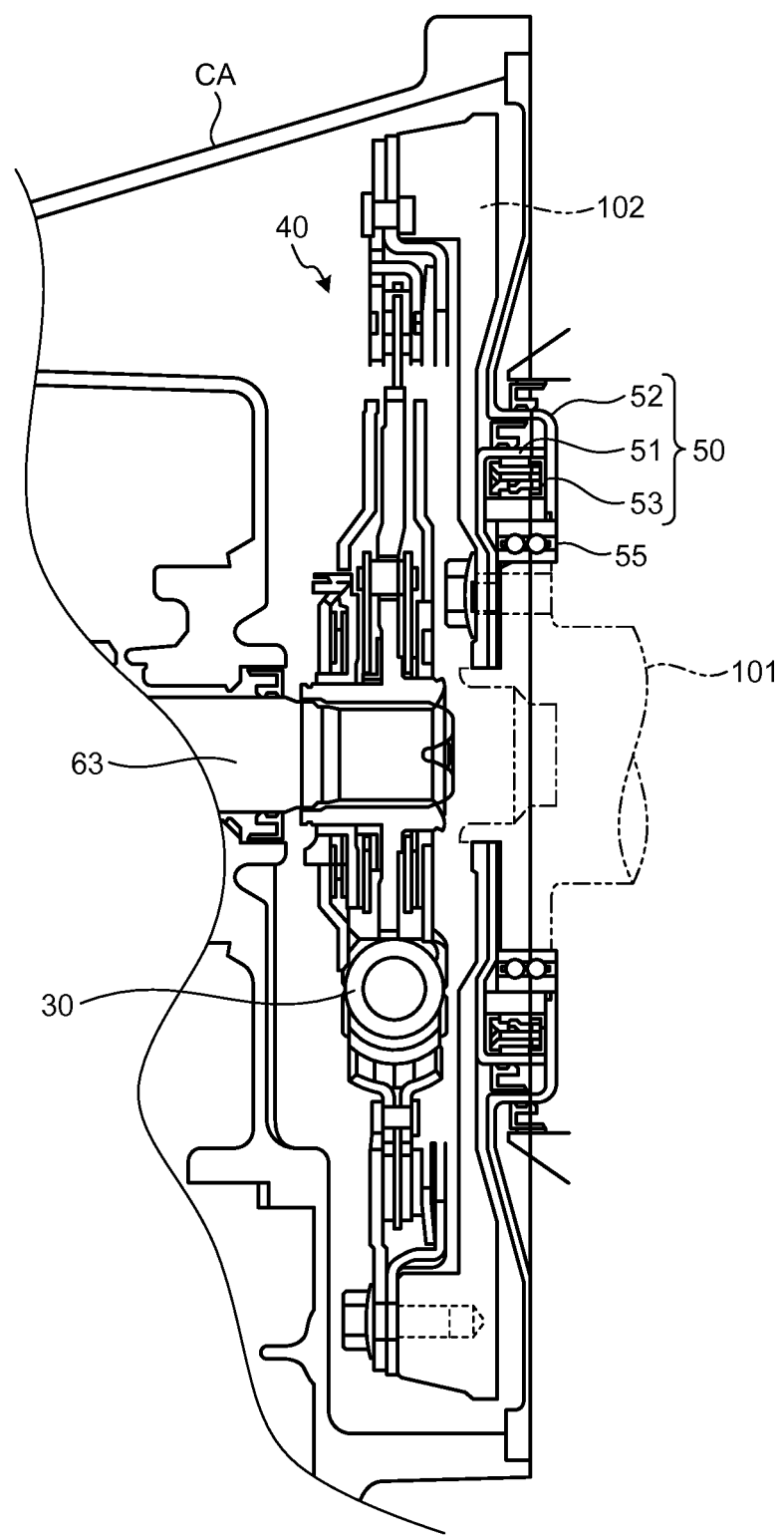
FIG. 3 is a view illustrating another example of the arrangement of the one way clutch.

The damper device 30 is arranged between the transmission input shaft 63 and the engine output shaft 101 for inhibiting and absorbing torque variation therebetween. The damper device 30 has a configuration well-known in this technical field. In the vehicular transmission 1, the transmission input shaft 63 is arranged concentrically with the engine output shaft 101 and the damper device 30 is attached to one end on a side of the engine output shaft 101 of the transmission input shaft 63 (FIGS. 2 and 3).

The torque limiter 40 is the overload input inhibiting device which enables torque transmission between the transmission input shaft 63 and the engine output shaft 101 but inhibits an input of excessive torque larger than predetermined torque therebetween. The torque limiter 40 is arranged between the transmission input shaft 63 and the engine output shaft 101 as in the case of the damper device 30.

The torque limiter 40 has a configuration well-known in this technical field and is provided with first and second rotating bodies, a plurality of first and second engaging bodies, and an elastic body, for example. The first rotating body is a member which rotates integrally with the engine output shaft 101 around the transmission input shaft 63. Herein, a flywheel 102 is attached to one end on a side of the transmission input shaft 63 of the engine output shaft 101, so that the first rotating body is fixed to the flywheel 102. The second rotating body is a member which rotates integrally with the transmission input shaft 63 around the transmission input shaft 63. Each of the first engaging bodies being an annular plate material centering on the transmission input shaft 63 rotates integrally with the first rotating body. Each of the second engaging bodies being an annular plate-shaped frictional body centering on the transmission input shaft 63 rotates integrally with the second rotating body. Each of the second engaging bodies is arranged between the first engaging bodies. The elastic body is an annular member which applies pressing force in an axial direction between the first and second engaging bodies; this engages the first and second rotating bodies with each other by the pressing force and frictional force of the frictional body to connect the transmission input shaft 63 to the engine output shaft 101.

Critical torque for disconnecting the transmission input shaft 63 from the engine output shaft 101 at the time of overload is set in the torque limiter 40. For example, in the torque limiter 40, when torque (≤critical torque) is input from any one of the transmission input shaft 63 and the engine output shaft 101, the transmission input shaft 63 and the engine output shaft 101 rotate while maintaining their connected state. Therefore, the torque limiter 40 enables the torque transmission between the vehicular transmission 1 and the engine ENG when the input torque is not larger than the critical torque. On the other hand, the torque limiter 40 allows the first engaging body and the second engaging body (frictional body) to rotate while sliding upon each other when the input torque becomes larger than the critical torque, so that this disconnects the vehicular transmission 1 from the engine ENG to generate relative rotation between the transmission input shaft 63 and the engine output shaft 101.

In this embodiment, the torque limiter 40 is integrated with the damper device 30 (FIGS. 2 and 3). The integrated damper device 30 and torque limiter 40 has a configuration well-known in this technical field. For example, the torque limiter 40 is arranged on an outer side in a radial direction of the damper device 30 and an annular second rotating body is connected to the transmission input shaft 63 through the damper device 30. The torque limiter 40 is arranged so as to be opposed to the flywheel 102 in the axial direction and an annular first rotating body is attached to an outer side portion in the radial direction of the flywheel 102. Therefore, in the vehicular transmission 1, the damper device 30 and the torque limiter 40 are arranged such that an increase in shaft length (length in the axial direction of the transmission input shaft 63 and the like) is inhibited.

The one-way clutch 50 is a device for locking rotation in one direction which prohibits reverse rotation of the engine ENG while allowing normal rotation of the engine ENG. The one-way clutch 50 is configured such that engaging units are disengaged from each other when the engine output shaft 101 normally rotates and this allows the normal rotation of the engine ENG by this disengaging operation. On the other hand, the one-way clutch 50 is configured such that the engaging units engage with each other when the engine output shaft 101 is about to reversely rotate and this prohibits the reverse rotation of the engine ENG by locking the rotation of the engine output shaft 101 by this engaging operation. Meanwhile, the normal rotation is intended to mean the rotation in a rotational direction of the engine output shaft 101 when the engine torque is output.

Herein, there is the vehicular transmission 1 in which there is annular space between the torque limiter 40 and the engine ENG in the case CA and that in which the annular space may be created only by slight change in shape of the torque limiter 40 and the like. The vehicular transmission 1 of this embodiment inhibits an increase in size by arranging the one-way clutch 50 in such annular space between the torque limiter 40 and the engine ENG. Strictly speaking, since the flywheel 102 is interposed between the torque limiter 40 and the engine ENG, there is the vehicular transmission in which there is the annular space between the flywheel 102 and the engine ENG or that in which the annular space may be created only by the slight change in shape of the flywheel 102 and the like. Therefore, the vehicular transmission 1 of this embodiment inhibits the increase in size by arranging the one-way clutch 50 in such annular space between the flywheel 102 and the engine ENG.

The one-way clutch 50 includes an outer ring 51 and an inner ring 52 which may rotate relative to each other around the transmission input shaft 63 and further includes a plurality of engaging bodies 53 such as sprags between the outer ring 51 and the inner ring 52. The one-way clutch 50 is put into a disengaged state when the outer ring 51 and the inner ring 52 are about to relatively rotate in one direction to allow the relative rotation, but put into an engaged state in which the outer ring 51 and the inner ring 52 are integrated with each other through the engaging body 53 when they are about to relatively rotate in an opposite direction.

The one-way clutch 50 illustrated in FIG. 2 is arranged in the annular space between an outer side in the radial direction of the flywheel 102 and an inner side in the radial direction of the case CA. This arrangement is especially useful for inhibiting the increase in shaft length of the vehicular transmission 1. When the annular space is present in advance or when it is possible to create the annular space by the change in shape of the flywheel 102, this arrangement may also inhibit an increase in the radial direction of the vehicular transmission 1. Further, when the annular space is present in advance, it is possible to use the same case CA, the flywheel 102, the damper device 30, and the torque limiter 40 as those of the vehicular transmission without the one-way clutch 50, so that the one-way clutch 50 may be arranged such that the increase in size and an increase in cost of the vehicular transmission 1 are inhibited.

In the one-way clutch 50, the outer ring 51 is fixed to an inner peripheral surface of the case CA and the inner ring 52 is fixed to the outer side portion in the radial direction of the flywheel 102. Therefore, the inner ring 52 rotates together with the flywheel 102 relative to the outer ring 51 at the time of the normal rotation of the engine ENG. Therefore, when the one-way clutch 50 is disengaged, the engine torque is transmitted to the transmission input shaft 63. On the other hand, in the one-way clutch 50, when the torque in a direction opposite to that of the engine torque acts on the inner ring 52, the inner ring 52 engages with the outer ring 51 through the engaging body 53. Therefore, when the one-way clutch 50 is engaged, the engine output shaft 101 is fixed to the case CA through the flywheel 102 and the rotation of the engine output shaft 101 is locked, so that the reverse rotation of the engine ENG is prohibited.

Herein, the inner ring 52 in this case may also be integrally formed with the flywheel 102, for example. According to this, the number of members to be assembled decreases by one, so that an assembling property of the vehicular transmission 1 is improved. In this case, it is possible to configure the vehicular transmission without the one-way clutch 50 only by replacing the flywheel 102 with which the inner ring 52 is integrated with the flywheel without the inner ring 52. Therefore, the same members may be used in the vehicular transmission and the vehicular transmission 1 of this embodiment except the flywheel, so that the increase in cost may be inhibited.

The one-way clutch 50 may also be arranged as illustrated in FIG. 3. The one-way clutch 50 illustrated in FIG. 3 is arranged in the annular space between an inner side portion in the radial direction of the flywheel 102 and the engine ENG. This arrangement is especially useful for inhibiting the increase in the radial direction of the vehicular transmission 1. When the annular space is present in advance, or when it is possible to create the annular space by the change in shape of the flywheel 102, this arrangement may also inhibit the increase in shaft length of the vehicular transmission 1. Further, when the annular space is present in advance, it is possible to use the same case CA, the flywheel 102, the damper device 30, and the torque limiter 40 as those of the vehicular transmission without the one-way clutch 50, so that it is possible to arrange the one-way clutch 50 such that the increase in size and the increase in cost of the vehicular transmission 1 is inhibited.

It is also possible to fix the outer ring 51 of the one-way clutch 50 to the inner peripheral surface of the case CA as illustrated in FIG. 2. In this case, the inner ring 52 may be fixed to at least one of the inner side portion in the radial direction of the flywheel 102 or the engine output shaft 101.

In this illustration, the outer ring 51 is fixed to at least one of the inner side portion in the radial direction of the flywheel 102 and the engine output shaft 101 and the inner ring 52 is fixed to the inner peripheral surface of the case CA. The outer ring 51 includes an annular portion which covers each engaging body 53 from an outer side in the radial direction and an extended portion which extends from one end of the annular portion radially inwardly along the flywheel 102. The extended portion of the outer ring 51 is fixed to the inner side portion in the radial direction of the flywheel 102 and the engine output shaft 101. The inner ring 52 includes an annular portion which covers each engaging body 53 from an inner side in the radial direction and an extended portion which extends from one end of the annular portion radially inwardly along the engine ENG. The extended portion of the inner ring 52 is fixed to the inner peripheral surface of the case CA and the annular portion thereof is attached to the engine output shaft 101 through a bearing 55. The bearing 55 is arranged so as not to prevent the rotation of the engine output shaft 101. Therefore, the outer ring 51 in this case rotates together with the flywheel 102 relative to the inner ring 52 at the time of the normal rotation of the engine ENG. Therefore, in this case also, when the one-way clutch 50 is disengaged, the engine torque is transmitted to the transmission input shaft 63. On the other hand, in the one-way clutch 50, when the torque in the direction opposite to that of the engine torque acts on the outer ring 51, the outer ring 51 engages with the inner ring 52 through the engaging body 53. Therefore, in this case also, the reverse rotation of the engine ENG is prohibited when the one-way clutch 50 is engaged.

Herein, the outer ring 51 in this case may also be integrally formed with the flywheel 102, for example. According to this, the number of members to be assembled decreases by one, so that the assembling property of the vehicular transmission 1 is improved. In this case, it is possible to configure the vehicular transmission without the one-way clutch 50 only by replacing the flywheel 102 with which the outer ring 51 is integrated with the flywheel without the outer ring 51. Therefore, the same members may be used in the vehicular transmission and the vehicular transmission 1 of this embodiment except the flywheel, so that the increase in cost may be inhibited.

Figure 4:
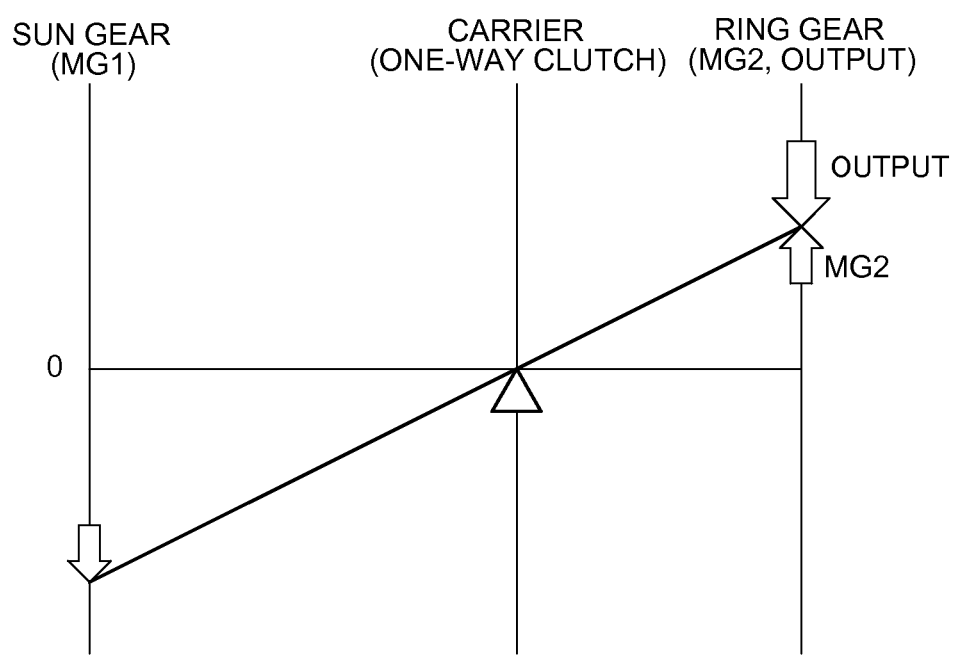
FIG. 4 is a view of an example of a alignment chart when the one-way clutch is in an engaged state.

In any form, when the one-way clutch 50 is engaged, the carrier C of the first differential mechanism 10 cannot rotate as illustrated in FIG. 4. Therefore, by the power running drive of the first motor-generator MG1, motor torque is transmitted to the drive wheel side through the first gear 71. At that time, by the power running drive of the second motor-generator MG2, the motor torque is transmitted to the drive wheel side through the first gear 71. Therefore, in the hybrid system, EV (electric vehicle) travel by using the power of each of the first and second motor-generators MG1 and MG2 becomes possible.

As described above, in the vehicular transmission 1, the locking device (one-way clutch 50) which allows only the normal rotation regarding the rotation of the engine ENG is arranged between the torque limiter 40 and the engine ENG (between the flywheel 102 and the engine ENG). Therefore, the vehicular transmission 1 may use the existing space between them or the space formed by slight change of another member for arranging the locking device, so that it is possible to provide the locking device which allows only the normal rotation regarding the rotation of the engine ENG while inhibiting the increase in size.

The vehicular transmission 1 does not require a new member other than the locking device when such locking device is provided, so that it is possible to carry out not only the EV travel (MG2 EV travel) by the motor torque at the time of the power running drive of the second motor-generator MG2 but also the EV travel (MG1 & 2 EV travel) by the motor torque at the time of the power running drive of each of the first and second motor-generators MG1 and MG2 by a simple configuration.

Further, in the vehicular transmission 1, it is possible to allow the torque limiter 40 to operate as the overload input inhibiting device for the locking device when the excessive torque is input to the locking device when the locking device is engaged. That is to say, in the vehicular transmission 1, it is also possible to use the torque limiter 40 for inhibiting the input of the excessive torque between the vehicular transmission 1 and the engine ENG also for inhibiting the input of the excessive torque to the locking device. In this manner, the vehicular transmission 1 may share the torque limiter 40, so that it is not required to provide a dedicated overload input inhibiting device for inhibiting the input of the excessive torque to the locking device in the engaged state at the time of travel in a state in which the engine ENG is disconnected from the drive wheel. Therefore, the vehicular transmission 1 may inhibit the increase in size in this point also and may further inhibit the increase in cost. The vehicular transmission 1 may avoid the input of the excessive torque to the locking device by the torque limiter 40, so that this may improve durability of the locking device.

Further, in the vehicular transmission 1, the torque limiter 40 is arranged in the annular space on the outer side in the radial direction of the damper device 30, so that the torque limiter 40 may be arranged such that the increase in size is inhibited.

For the above-described reason, the vehicular transmission 1 may provide the locking device (one-way clutch 50) which allows the normal rotation of the engine ENG and the overload input inhibiting device (torque limiter 40) which inhibits the input of the excessive torque to the locking device while inhibiting the increase in size and cost.

From other point of view, in the vehicular transmission 1, the locking device is arranged between the damper device 30 and the engine ENG. Therefore, when it is switched between the MG2 EV travel and the MG1 & 2 EV travel, the vehicular transmission 1 may absorb and inhibit the torque variation associated with switch by the damper device 30, so that this may decrease noise and vibration at that time. That is to say, the vehicular transmission 1 is not required to provide a dedicated damper device for such switch between the power sources at the time of the EV travel. Therefore, the vehicular transmission 1 may decrease the noise and vibration at the time of the switch between the MG2 EV travel and the MG1 & 2 EV travel while inhibiting the increase in size and cost.

Although the torque limiter 40 is arranged on a side closer to the engine ENG than the damper device 30 in a power transmission pathway from the engine ENG in this embodiment, the damper device 30 may also be arranged on the side closer to the engine ENG than the torque limiter 40 in the power transmission pathway. Even when the arrangement of the damper device 30 and the torque limiter 40 is changed in this manner, the damper device 30 may absorb and inhibit the torque variation when the MG2 EV travel and the MG1 & 2 EV travel are switched as in the case of the above-described vehicular transmission 1. Further, the torque limiter 40 may be operated as the overload input inhibiting device for inhibiting the input of the excessive torque to the locking device (one-way clutch 50) as in the case of the above-described vehicular transmission 1. Therefore, the vehicular transmission may obtain an effect similar to that of the above-described vehicular transmission 1 even when the arrangement of the damper device 30 and the torque limiter 40 is changed.

Figure 5:
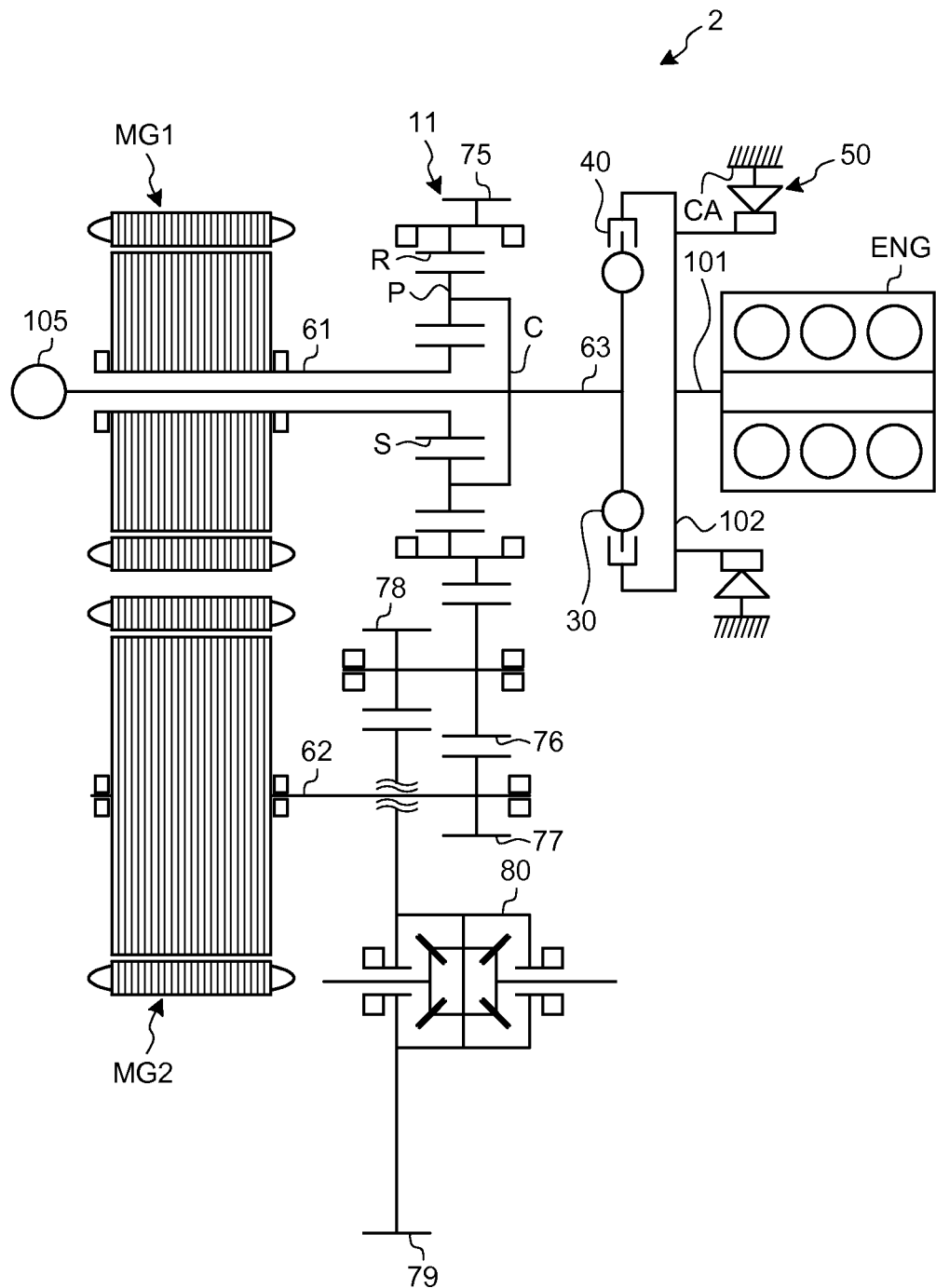
FIG. 5 is a view of another example of the hybrid system to which the vehicular transmission of the embodiment is applied.

Although the vehicular transmission 1 in the uniaxial hybrid system is described as an example in this embodiment, the arrangement of the locking device (one-way clutch 50) in the vehicular transmission 1 may also be applied to a polyaxial hybrid system in which the first motor-generator MG1 and the second motor-generator MG2 are not coaxially arranged by an arrangement of the MG1 rotational shaft 61 and the MG2 rotational shaft 62 shifted in the radial direction. A vehicular transmission 2 in this case is illustrated in FIG. 5. Meanwhile, as a matter of convenience of description, the member to which the same reference numeral as that of the vehicular transmission 1 is assigned represents the same member as the vehicular transmission 1.

The vehicular transmission 2 is provided with the first and second motor-generators MG1 and MG2, a differential mechanism 11, the damper device 30, the torque limiter 40, and the locking device (one-way clutch 50) in the case CA. The vehicular transmission 2 also is illustrated as the transaxle in which the differential device 80 is embedded in the same case CA.

The differential mechanism 11 is provided with rotational elements to each of which the first motor-generator MG1, the output side (drive wheel side) and the second motor-generator MG2, and the engine ENG are connected and serves as the power dividing mechanism and the transmission mechanism.

Herein, the single pinion planetary gear mechanism provided with the sun gear S, the ring gear R, the carrier C, and a plurality of pinion gears P being the rotational elements is illustrated as the differential mechanism 11. In the differential mechanism 11, the sun gear S, the ring gear R, and the carrier C may rotate relative to one another.

The sun gear S is connected to the MG1 rotational shaft 61 concentrically arranged therewith and may rotate integrally with the MG1 rotational shaft 61. The carrier C holds each pinion gear P so as to be rotatable and revolvable. The carrier C is connected to the transmission input shaft 63 to integrally rotate with the transmission input shaft 63. The carrier C is connected to the engine output shaft 101 through the transmission input shaft 63, the damper device 30, and the torque limiter 40. The ring gear R also includes a first gear 75 as an externally-toothed gear.

The first gear 75 transmits the power of the engine ENG and the first motor-generator MG1 to the drive wheel side. The vehicular transmission 2 is provided with a second gear 76 meshing with the first gear 75 and a third gear 77 meshing with the second gear 76. The third gear 77 is concentrically arranged with the second motor-generator MG2 to be attached to the MG2 rotational shaft 62. The second gear 76 meshing with the third gear 77 rotates integrally with a fourth gear 78 concentrically arranged therewith. The vehicular transmission 2 is provided with a fifth gear 79 as a final gear meshing with the fourth gear 78.

In this vehicular transmission 2 also, the damper device 30, the torque limiter 40, and the one-way clutch 50 have the same structures as those of the above-described vehicular transmission 1 and are arranged in the same manner as the vehicular transmission 1. Therefore, the vehicular transmission 2 may obtain the same effect as that of the vehicular transmission 1 regardless of the configuration of the hybrid system.

In the illustration above, one engaging unit (outer ring 51 or inner ring 52) of the locking device is provided on the case CA and the other engaging unit (inner ring 52 or outer ring 51) is provided on the flywheel 102 so as to arrange the locking device (one-way clutch 50) between the torque limiter 40 and the engine ENG. However, the other engaging unit may also be arranged so as to be able to integrally rotate with a member on the engine ENG side in the torque limiter 40 and the engine output shaft 101 if both requirements in that the locking device is arranged between the torque limiter 40 and the engine ENG and only the normal rotation is allowed regarding the rotation of the engine ENG are satisfied. In this case also, the vehicular transmission may obtain the effect similar to that of the above-described vehicular transmissions 1 and 2.

[First Variation]

In the above-described embodiment, the one-way clutch 50 is described as an example of the locking device which allows the normal rotation of the engine ENG but prohibits the reverse rotation thereof. In this variation, the one-way clutch 50 is replaced with a meshing clutch in the various vehicular transmissions 1 and the like described in the embodiment and the meshing clutch is used as the locking device. Herein, a dog clutch 150 is described as an example of the meshing clutch.

Figure 6:
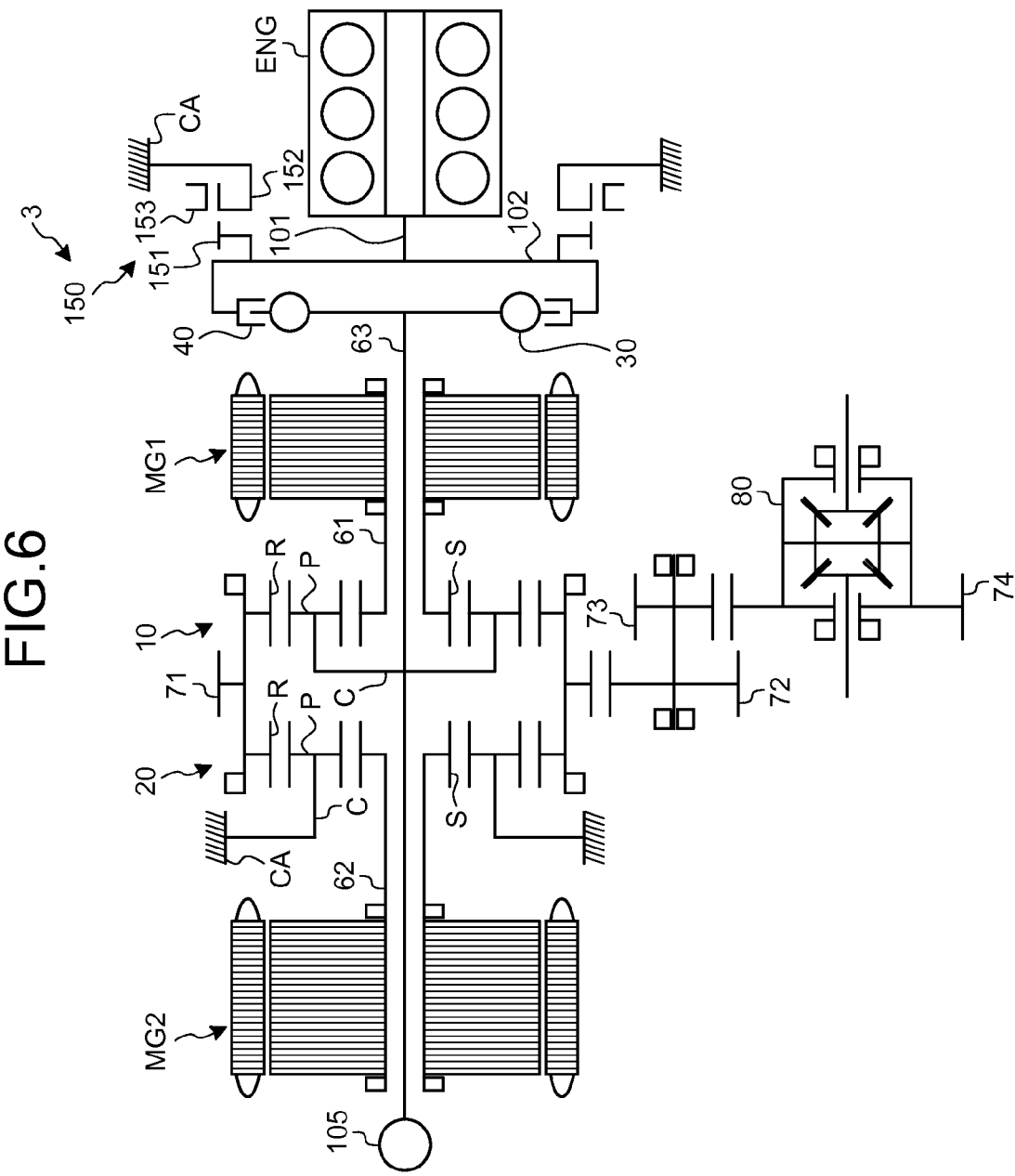
FIG. 6 is a view of an example of a hybrid system to which a vehicular transmission of a first variation is applied.
Figure 7:
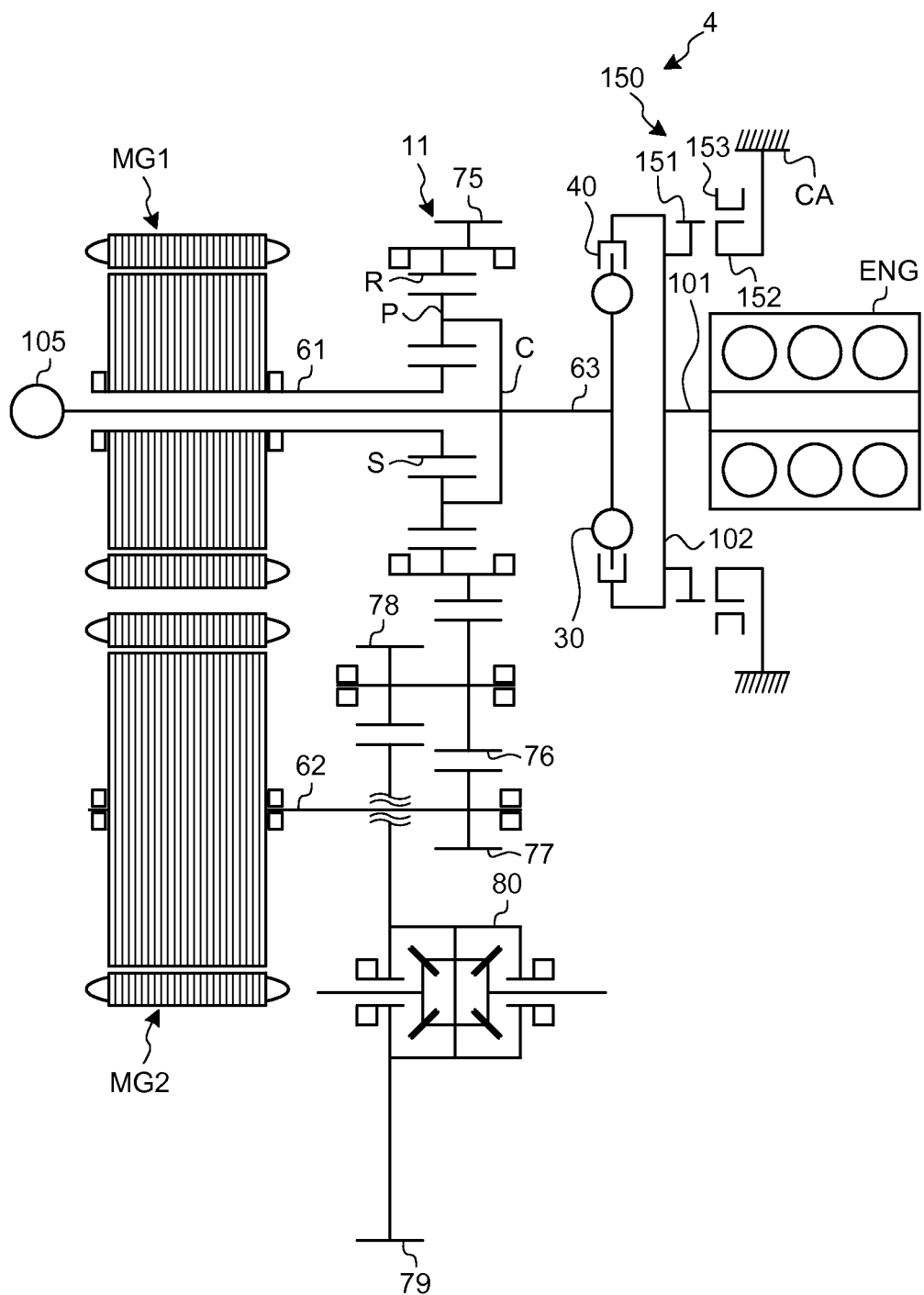
FIG. 7 is a view of another example of the hybrid system to which the vehicular transmission of the first variation is applied.

Reference numeral 3 in FIG. 6 represents a vehicular transmission of this variation applied to a uniaxial hybrid system. The vehicular transmission 3 is obtained by replacing the one-way clutch 50 with a dog clutch 150 in the vehicular transmission 1. Reference numeral 4 in FIG. 7 represents a vehicular transmission of this variation applied to a polyaxial hybrid system. The vehicular transmission 4 is obtained by replacing the one-way clutch 50 with the dog clutch 150 in a vehicular transmission 2. Meanwhile, the dog clutch 150 herein illustrated and a peripheral configuration thereof are the same regardless of whether the hybrid system is uniaxial or polyaxial. Therefore, the dog clutches 150 of the vehicular transmissions 3 and 4 are herein collectively described.

The dog clutch 150 is provided with a first engaged unit 151 attached to an engine ENG side, a second engaged unit 152 attached to a case CA, and an engaging unit 153 which engages or disengages the first engaged unit 151 with or from the second engaged unit 152.

The dog clutch 150 is arranged in the same position as the one-way clutch 50. That is to say, the dog clutch 150 is arranged between the torque limiter 40 and the engine ENG. Therefore, the first engaged unit 151 is provided so as to be integrally rotatable with a member on the engine ENG side of the torque limiter 40, an engine output shaft 101, and a flywheel 102.

FIGS. 6 and 7 illustrate the first engaged unit 151 attached to the flywheel 102. Therefore, the dog clutch 150 may be arranged in annular space described in the embodiment. The first engaged unit 151 may also be integrally formed with the flywheel 102. According to this, the number of members to be assembled decreases by one, so that an assembling property of the vehicular transmissions 3 and 4 is improved. In this case, it is possible to configure the vehicular transmission without the dog clutch 150 only by replacing the flywheel 102 with which the first engaged unit 151 is integrated with the flywheel without the first engaged unit 151. Therefore, the same members may be used in the vehicular transmission and the vehicular transmissions 3 and 4 of this variation except the flywheel, so that an increase in cost may be inhibited.

The engaging unit 153 may reciprocate in an axial direction (axial direction of the engine output shaft 101 and the like) by an actuator (not illustrated). In the dog clutch 150, the engaging unit 153 is engaged in advance with any one of the first engaged unit 151 and the second engaged unit 152, for example, and this state is made a disengaged state. The dog clutch 150 is put into an engaged state when the first engaged unit 151 is engaged with the second engaged unit 152 by the engaging unit 153.

The engine output shaft 101 may rotate when the dog clutch 150 is in the disengaged state and cannot rotate when the dog clutch 150 is in the engaged state. Therefore, it is desirable that the dog clutch 150 is set to be in the disengaged state at normal time at which the engine ENG should normally rotate such that the normal rotation of the engine ENG is allowed. At that time, the dog clutch 150 contributes to improve fuel consumption by creating the disengaged state without operating the actuator. A control device prohibits the reverse rotation of the engine ENG by engaging the dog clutch 150 when torque in a direction opposite to that of the engine torque acts on the first engaged unit 151 or when generation of the torque in the opposite direction may be predicted.

Figure 8:
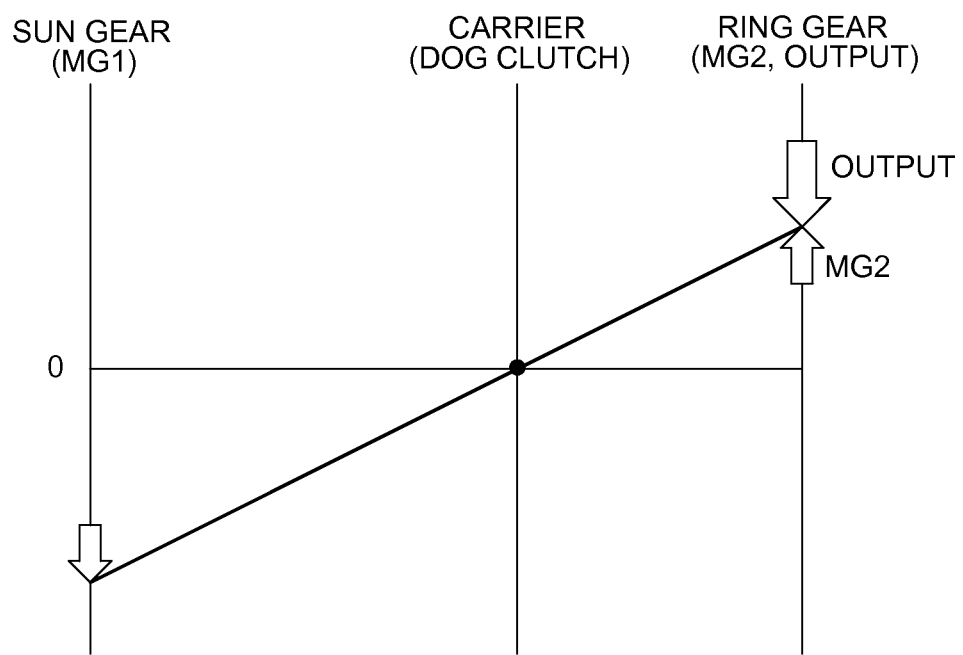
FIG. 8 is a view of an example of a alignment chart when a dog clutch is in an engaged state.

FIG. 8 is a alignment chart when the dog clutch 150 is in the engaged state. As described in the embodiment, in the hybrid system, motor torque by power running drive of first and second motor-generators MG1 and MG2 may be transmitted to a drive wheel side in this state, so that EV travel using power of each of them becomes possible.

In this manner, the vehicular transmissions 3 and 4 may obtain a same functional effect as that of the embodiment also when the one-way clutch 50 is replaced with the dog clutch 150. Meanwhile, regarding the functional effect, the one-way clutch 50 may be read as the dog clutch 150 in the description of the various vehicular transmissions 1 and the like in the embodiment.

[Second Variation]

In this variation, the one-way clutch 50 is replaced with a brake 250 in the various vehicular transmissions 1 and the like described in the above-described embodiment and the brake 250 is used as a locking device.

Figure 9:
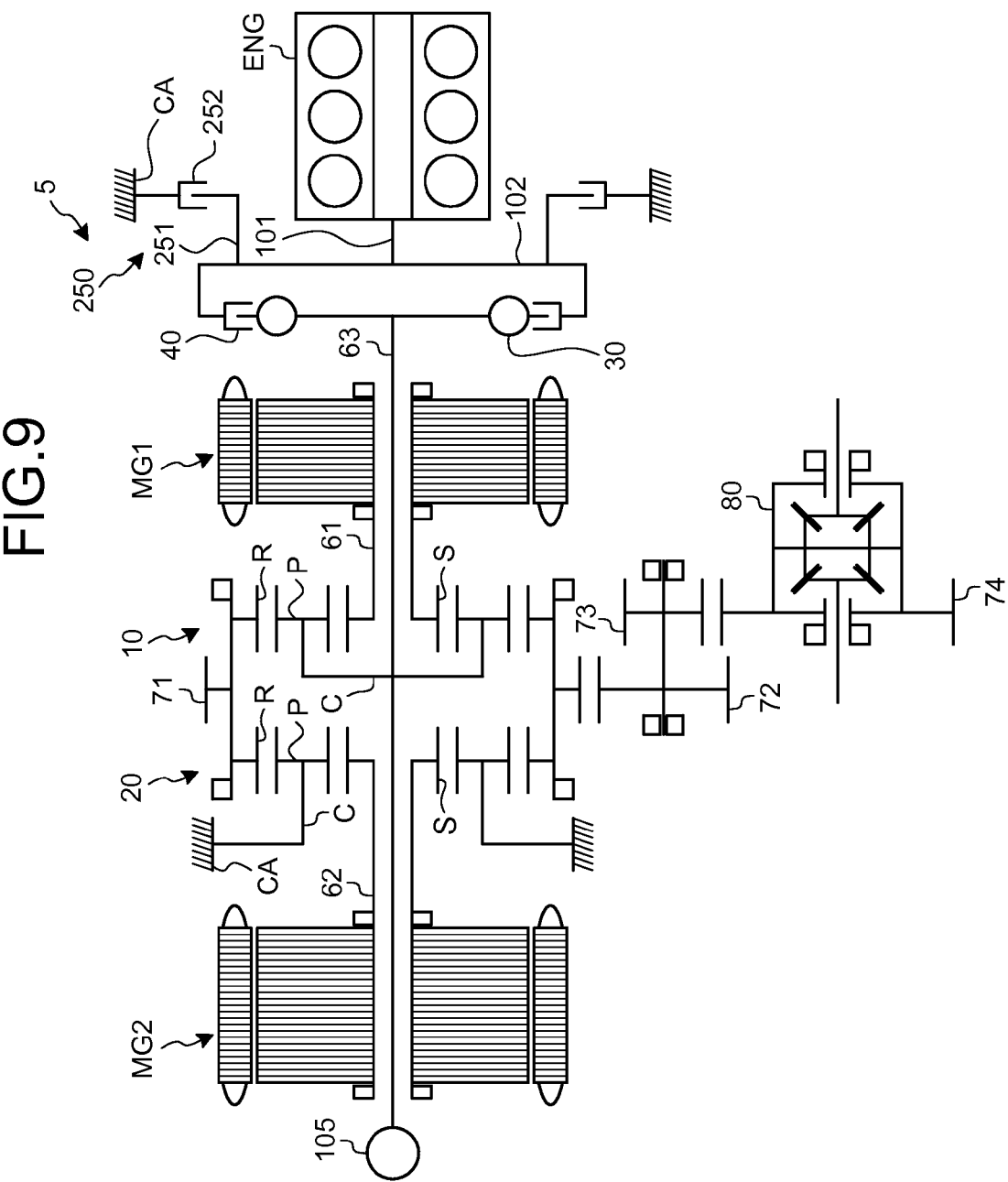
FIG. 9 is a view of an example of a hybrid system to which a vehicular transmission of a second variation is applied.
Figure 10:
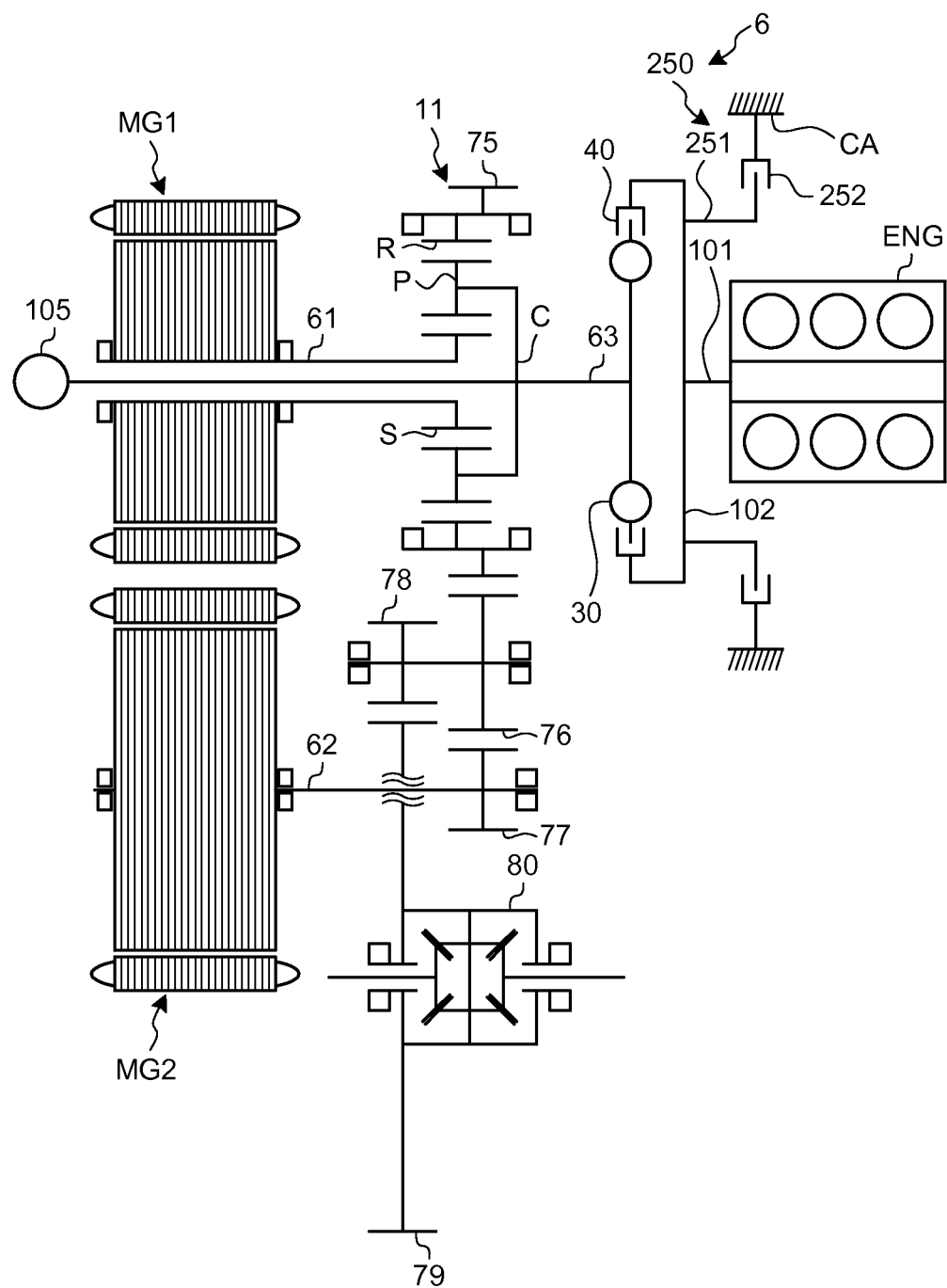
FIG. 10 is a view of another example of the hybrid system to which the vehicular transmission of the second variation is applied.

Reference numeral 5 in FIG. 9 represents a vehicular transmission of this variation applied to a uniaxial hybrid system. The vehicular transmission 5 is obtained by replacing the one-way clutch 50 with the brake 250 in the vehicular transmission 1. Reference numeral 6 in FIG. 10 represents a vehicular transmission of this variation applied to a polyaxial hybrid system. The vehicular transmission 6 is obtained by replacing the one-way clutch 50 with the brake 250 in a vehicular transmission 2. Meanwhile, the brake 250 herein illustrated and a peripheral configuration thereof are the same regardless of whether the hybrid system is uniaxial or polyaxial. Therefore, the brakes 250 of the vehicular transmissions 5 and 6 are herein collectively described.

The brake 250 is provided with a first engaging unit 251 attached to an engine ENG side and a second engaging unit 252 attached to a case CA. The brake 250 is configured to stop rotation of an engine ENG by allowing the first engaging unit 251 and the second engaging unit 252 to be brought into contact with each other, for example, by an actuator (not illustrated) and put them into an engaged state. Therefore, reverse rotation of the engine ENG is prohibited by controlling the brake 250 in the engaged state. On the other hand, the brake 250 is configured to allow the rotation of the engine ENG by separating the first engaging unit 251 from the second engaging unit 252 by the actuator, for example, and putting them into a disengaged state. Therefore, the engine ENG may allow normal rotation by controlling the brake 250 to the disengaged state.

The brake 250 is arranged in the same position as the one-way clutch 50. That is to say, the brake 250 is arranged between a torque limiter 40 and the engine ENG. Therefore, the first engaging unit 251 is provided so as to be able to integrally rotate with a member on the engine ENG side of the torque limiter 40, the engine output shaft 101, and a flywheel 102.

FIGS. 9 and 10 illustrate the first engaging unit 251 attached to the flywheel 102. Therefore, the brake 250 may be arranged in the annular space described in the embodiment. The first engaging unit 251 may also be integrally formed with the flywheel 102. According to this, the number of members to be assembled decreases by one, so that an assembling property of the vehicular transmissions 5 and 6 is improved. In this case, it is possible to configure the vehicular transmission without the brake 250 only by replacing the flywheel 102 with which the first engaging unit 251 is integrated with the flywheel without the first engaging unit 251. Therefore, the same members may be used in the vehicular transmission and the vehicular transmissions 5 and 6 of this variation except the flywheel, so that an increase in cost may be inhibited.

The engine output shaft 101 may rotate when the brake 250 is in the disengaged state and cannot rotate when the brake 250 is in the engaged state as described above. Therefore, it is desirable that the brake 250 is set to be in the disengaged state at normal time at which the engine ENG should normally rotate such that the normal rotation of the engine ENG is allowed. At that time, the brake 250 contributes to improve fuel consumption by creating the disengaged state without operating the actuator. A control device prohibits the reverse rotation of the engine ENG by engaging the brake 250 when torque in a direction opposite to the direction of engine torque acts on the first engaging unit 251 or when generation of the torque in the opposite direction may be predicted.

Figure 11:
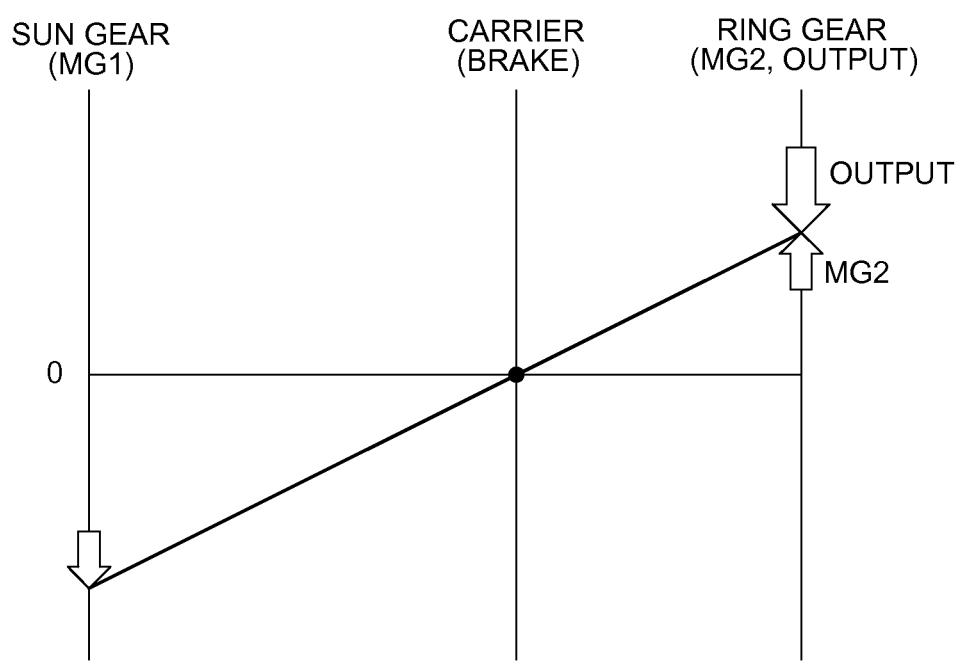
FIG. 11 is a view of an example of a alignment chart when a brake is in an engaged state.

FIG. 11 is a alignment chart when the brake 250 is in the engaged state. As described in the embodiment, in the hybrid system, motor torque by power running drive of the first and second motor-generators MG1 and MG2 may be transmitted to a drive wheel side in this state, so that EV travel using power of each of them becomes possible.

In this manner, the vehicular transmissions 5 and 6 may obtain a same functional effect as that of the embodiment also when the one-way clutch 50 is replaced with the brake 250. Meanwhile, regarding the functional effect, the one-way clutch 50 may be read as the brake 250 in the description of the various vehicular transmissions 1 and the like in the embodiment.

Although a structure and the arrangement of a damper device 30, the torque limiter 40, and the locking device (one-way clutch 50, dog clutch 150, and brake 250) are applied to the hybrid system including the two motor-generators (first and second motor-generators MG1 and MG2) in the above-described illustration, the structure and arrangement may also be applied to a hybrid system with a single motor-generator. The hybrid system with the single motor-generator may have a configuration obtained by removing the second motor-generator MG2 and a third gear 77 from the polyaxial hybrid system illustrated in FIGS. 5, 7, and 10, for example. Therefore, in the vehicular transmission in this case also, the structure and arrangement of the damper device 30, the torque limiter 40, and the locking device (one-way clutch 50, dog clutch 150, and brake 250) may be applied as in the case of the vehicular transmissions 1 to 6 of the above-described hybrid system including the first and second motor-generators MG1 and MG2 and the same effect as that of the vehicular transmissions 1 to 6 may be obtained.

REFERENCE SIGNS LIST

1, 2, 3, 4, 5, 6 Vehicular transmission
10 First differential mechanism
11 Differential mechanism
20 Second differential mechanism
30 Damper device
40 Torque limiter
50 One-way clutch (locking device)
51 Outer ring
52 Inner ring
53 Engaging body
63 Transmission input shaft
101 Engine output shaft
102 Flywheel
150 Dog clutch (locking device)
151 First engaged unit
152 Second engaged unit
153 Engaging unit
250 Brake (locking device)
251 First engaging unit
252 Second engaging unit
CA Case
ENG Engine
MG1 First motor-generator
MG2 Second motor-generator

The invention claimed is:

1. A vehicular transmission comprising:
a transmission input shaft to which engine torque is input;
a transmission mechanism to which the engine torque is input through the transmission input shaft;

a torque limiter arranged between the transmission input shaft and an engine, configured to enable torque transmission between the transmission input shaft and an engine output shaft and inhibit an input of excessive torque larger than predetermined torque between the transmission input shaft and the engine output shaft; and a locking device arranged between the torque limiter and the engine and on an inner side in a radial direction of a flywheel connected to the engine output shaft, configured to prohibit reverse rotation of the engine and allow normal rotation of the engine.

2. The vehicular transmission according to claim 1, wherein
a part of a configuration of the locking device is fixed to the flywheel.

3. The vehicular transmission according to claim 1, further comprising:
a damper device configured to inhibit and absorb torque variation between the transmission input shaft and the engine output shaft, wherein
the locking device is arranged between the damper device and the engine, and
the torque limiter is arranged on an outer side in a radial direction of the damper device so as to be opposed to the flywheel in an axial direction.

4. The vehicular transmission according to claim 1, wherein
a motor-generator in a hybrid system is connected to the transmission mechanism.

5. The vehicular transmission according to claim 1, wherein
the transmission mechanism is provided with a plurality of rotational elements capable of performing differential rotation to each of which a first motor-generator, a drive wheel side and a second motor-generator, and the engine are connected.

6. The vehicular transmission according to claim 1, wherein
the locking device is a one-way clutch which allows only the normal rotation regarding rotation of the engine.

7. The vehicular transmission according to claim 1, wherein
the locking device is a meshing clutch capable of stopping rotation of the engine output shaft.

8. The vehicular transmission according to claim 1, wherein
the locking device is a brake capable of stopping rotation of the engine output shaft.

9. The vehicular transmission according to claim 2, further comprising:
a damper device configured to inhibit and absorb torque variation between the transmission input shaft and the engine output shaft, wherein
the locking device is arranged between the damper device and the engine, and
the torque limiter is arranged on an outer side in a radial direction of the damper device so as to be opposed to the flywheel in an axial direction.

10. The vehicular transmission according to claim 2, wherein a motor-generator in a hybrid system is connected to the transmission mechanism.

11. The vehicular transmission according to claim 3, wherein a motor-generator in a hybrid system is connected to the transmission mechanism.

12. The vehicular transmission according to claim 2, wherein the transmission mechanism is provided with a plurality of rotational elements capable of performing differential rotation to each of which a first motor-generator, a drive wheel side and a second motor-generator, and the engine are connected.

13. The vehicular transmission according to claim 3, wherein
the transmission mechanism is provided with a plurality of rotational elements capable of performing differential rotation to each of which a first motor-generator, a drive wheel side and a second motor-generator, and the engine are connected.

14. The vehicular transmission according to claim 2, wherein
the locking device is a one-way clutch which allows only the normal rotation regarding rotation of the engine.

15. The vehicular transmission according to claim 3, wherein
the locking device is a one-way clutch which allows only the normal rotation regarding rotation of the engine.

16. The vehicular transmission according to claim 4, wherein
the locking device is a one-way clutch which allows only the normal rotation regarding rotation of the engine.

17. The vehicular transmission according to claim 5, wherein
the locking device is a one-way clutch which allows only the normal rotation regarding rotation of the engine.

18. The vehicular transmission according to claim 2, wherein
the locking device is a meshing clutch capable of stopping rotation of the engine output shaft.

19. The vehicular transmission according to claim 3, wherein
the locking device is a meshing clutch capable of stopping rotation of the engine output shaft.

20. The vehicular transmission according to claim 4, wherein
the locking device is a meshing clutch capable of stopping rotation of the engine output shaft.

* * * * *